(No Model.)
J. O. DE WOLF.
APPARATUS FOR REPAIRING PNEUMATIC TIRES.
No. 588,546. Patented Aug. 17, 1897.
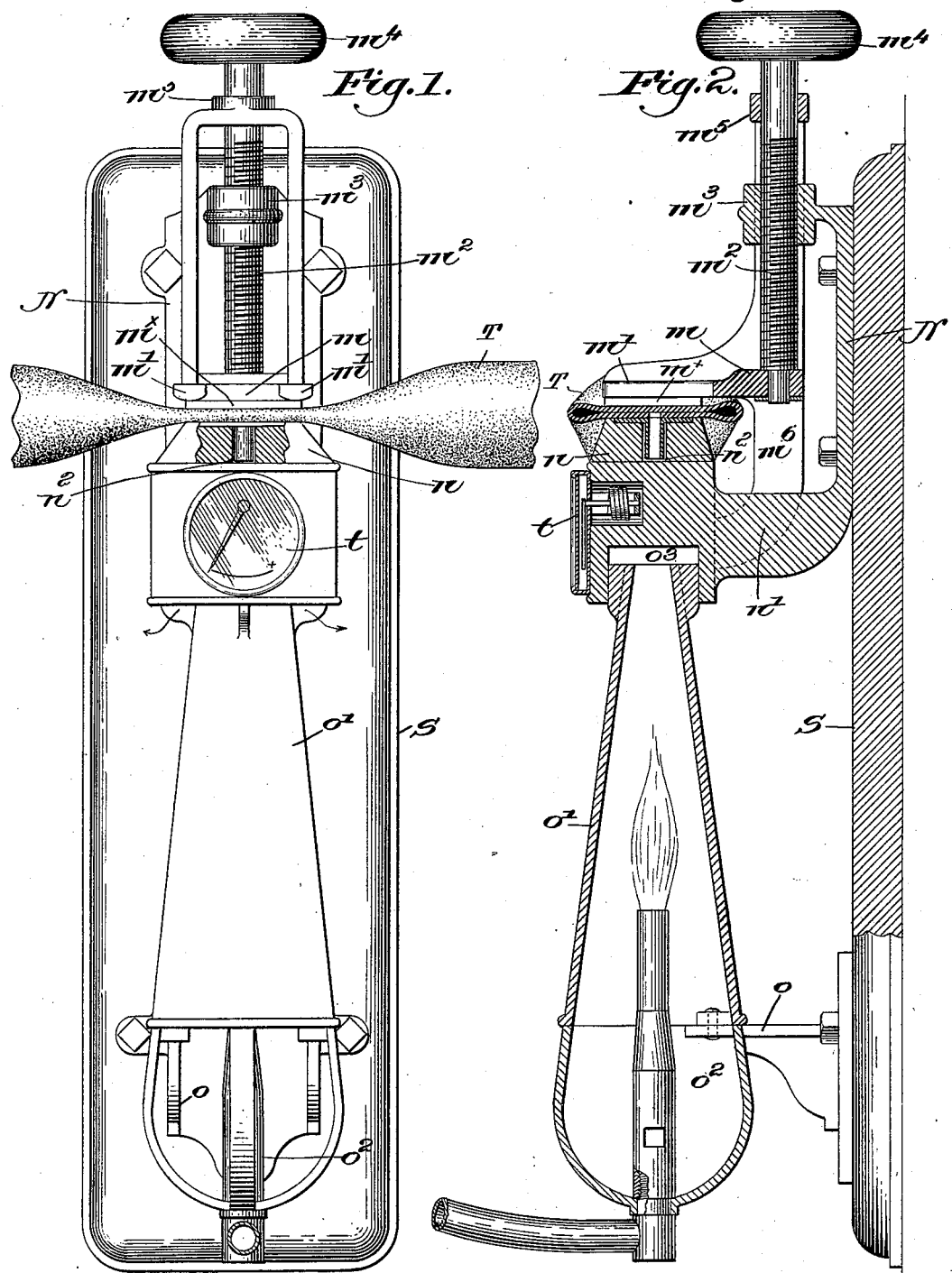

UNITED STATES PATENT OFFICE.

JOHN O. DE WOLF, OF CAMBRIDGE, MASSACHUSETTS, ASSIGNOR TO THE BOSTON WOVEN HOSE AND RUBBER COMPANY, OF BOSTON, MASSACHUSETTS.

APPARATUS FOR REPAIRING PNEUMATIC TIRES.

SPECIFICATION forming part of Letters Patent No. 588,546, dated August 17, 1897.

Application filed June 10, 1896. Serial No. 594,898. (No model.)

*To all whom it may concern:*

Be it known that I, JOHN O. DE WOLF, of Cambridge, county of Middlesex, and State of Massachusetts, have invented an Improvement in Apparatus for Repairing Pneumatic Tires, of which the following description, in connection with the accompanying drawings, is a specification, like letters on the drawings representing like parts.

This invention has for its object to provide an improved apparatus for repairing pneumatic tires without necessitating return of the tires to the original manufactory where they were produced.

The principal aim of my present invention has been to provide an apparatus capable of being set up and used in small and, it may be, isolated places, where the ordinary conveniences for repairing rubber-work are lacking, and whereby the valve-tubes so frequently cut from the tires by creeping of the latter on the wheel-rims may be replaced with facility and thoroughness.

The particular features of which my invention consists will be hereinafter particularly described, and pointed out in the claim.

Figure 1, in front elevation, partially broken away, represents one embodiment of my invention; and Fig. 2, a right-hand side elevation, partial section, of the same.

In the embodiment of my invention shown in the drawings, $m$ $n$ are two clamping members, the member $n$ being mounted upon or a part of an arm or bracket $n'$ of a plate N, shown as arranged upon a suitable back or support S.

The member $m$, shown as provided with forwardly-extended fingers or arms $m'$, is loosely journaled upon the lower end of the clamping-screw $m^2$, threaded in a boss $m^3$ on and near the upper end of the plate N and provided at its upper end with a suitable hand-wheel $m^4$, said member $m$ being guided in its vertical movements by a yoke $m^5$, embracing the smooth upper end of the screw $m^2$, and also by the depending guide-arms $m^6$, which travel in contact with a part of the arm $n'$.

The upper or top of the member $n$ constitutes a tire-seat, the same being provided near its middle with a recess or passage $n^2$, into which is inserted the tube to be welded or secured to the tire, the flange of said tube resting upon the surface surrounding said recess, said flange being pressed tightly against the tire and surrounding the aperture therein by screwing the clamping member $m$ down upon the tire, as shown in Fig. 1, a clamping-plate $m^\times$ being preferably interposed between the fingers $m'$ of the member $m$ and the tire T, there shown.

The back S is shown as provided with a suitable bracket $o$, on which is supported a conducting-hood $o'$, which conducts the products of combustion from the burner $o^2$ to and to heat the clamping member $n$ without direct contact of the flame with said member, said products of combustion issuing from the top of the hood, circulating first into the chamber $o^3$ of said clamping member, thence escaping between the walls of the latter and the upper end of the hood, as indicated by arrows, Fig. 1.

A usual thermostat or thermometer $t$, arranged upon or contiguous to one of the clamping members, as $n$, indicates to the operator the degree of heat applied.

The operation of the apparatus is obvious, briefly it being as follows, viz: The flange of the valve-tube to be applied to the tire is first inserted within the tire after having preferably prepared the surface of the flange and the inside of the tire, so that they may be in proper condition to unite at the desired points. The valve-stem extending through the tube is next placed in position in the recess $n^2$ in the member $n$, which has previously been heated to the proper temperature and preferably coated with soap or some other substance to prevent the rubber from adhering. The member $n$, with the tire and valve-tube in position, as just described, is then placed between the two clamping members, which are brought tightly together, thus clamping the flanged end of the tube against the adjacent portion of the tire, and the heat from the burner $o^2$ causes the tire and flanged end of said valve to become firmly united together.

Having described my invention and without limiting myself as to details, what I claim, and desire to secure by Letters Patent, is—

In an apparatus for repairing pneumatic tires, the opposing clamping members, one of which is provided with a tire-seat having a valve-tube-receiving recess, and a clamping-surface on said clamping member surrounding said recess and opposed to the clamping-surface of the other clamping member, combined with a burner-support and a burner arranged thereon, and a conducting-hood leading from said burner to said clamping members to heat the latter, substantially as described.

In testimony whereof I have signed my name to this specification in the presence of two subscribing witnesses.

JOHN O. DE WOLF.

Witnesses:
J. W. BELLOWS,
WM. W. BURGESS, Jr.